Jan. 9, 1923.
A. G. STEPHENSON.
BRAKE FOR TRUCKS.
FILED JAN. 19, 1920.
1,441,540
2 SHEETS-SHEET 2
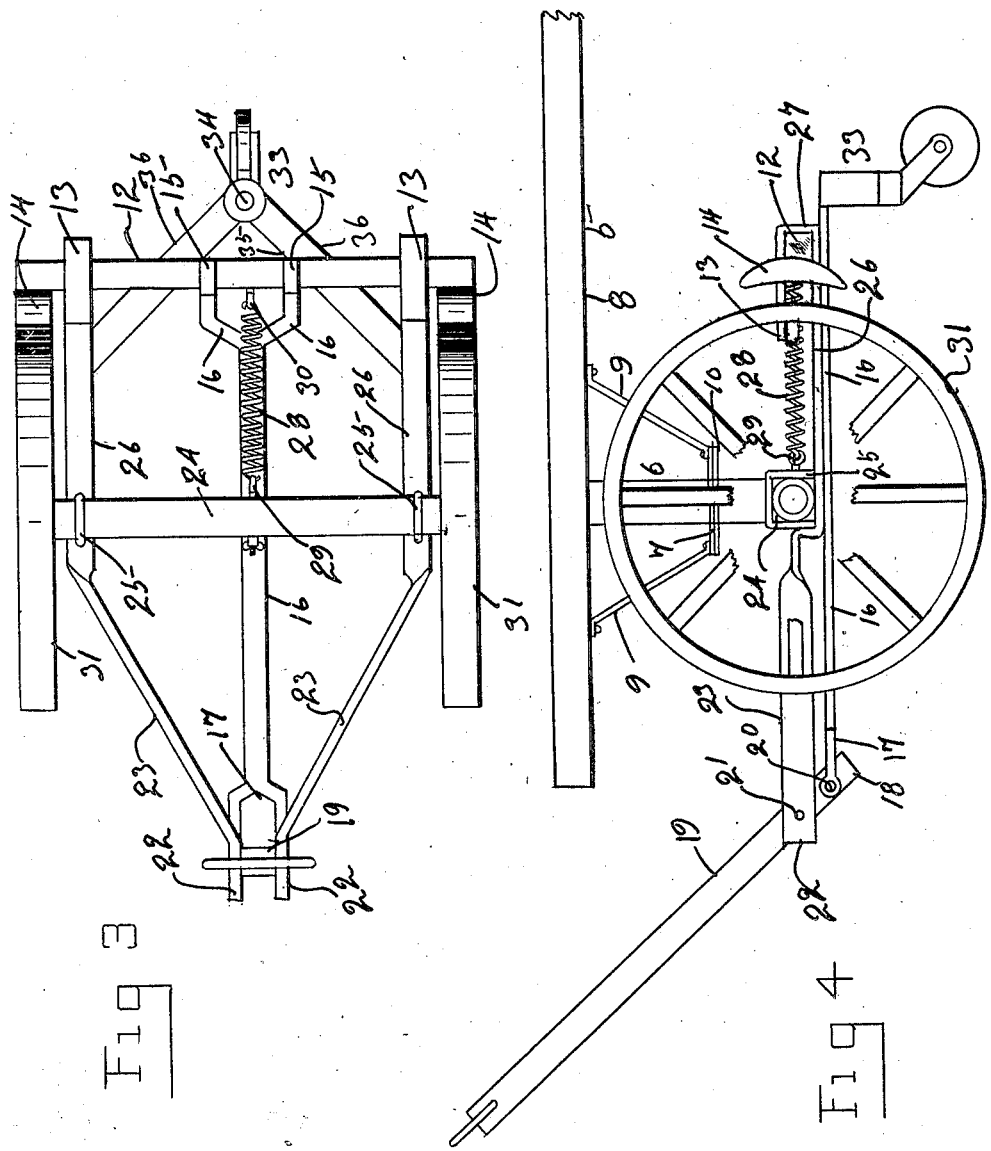
A. G. Stephenson, Inventor
Attorney Patented Jan. 9, 1923.

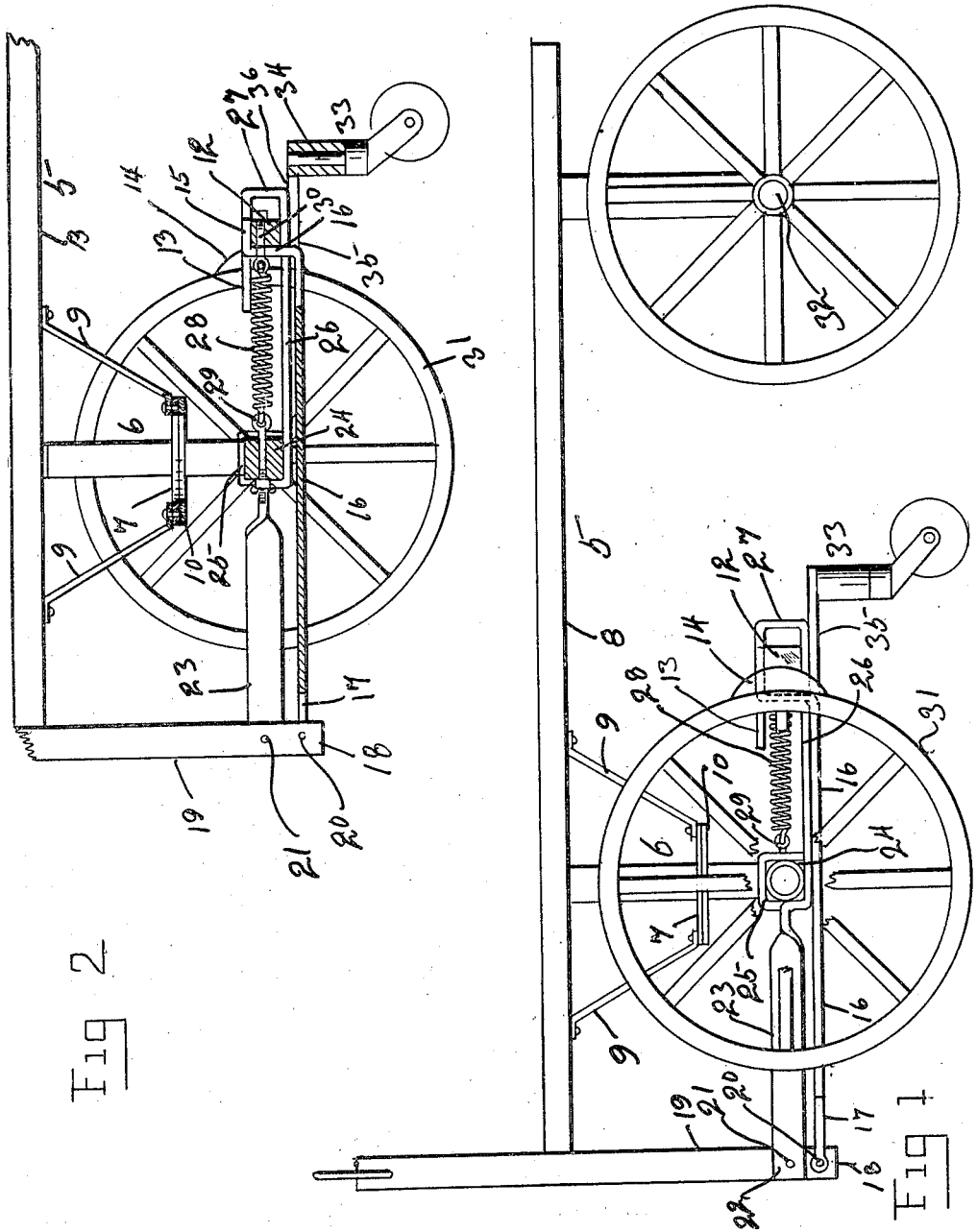

1,441,540

UNITED STATES PATENT OFFICE.

AXEL G. STEPHENSON, OF DENVER, COLORADO, ASSIGNOR, BY MESNE ASSIGNMENTS, TO THE RAILWAY SAFETY APPLIANCE COMPANY, A CORPORATION OF COLORADO.

BRAKE FOR TRUCKS.

Application filed January 19, 1920. Serial No. 352,533.

*To all whom it may concern:*

Be it known that I, AXEL G. STEPHENSON, a citizen of the United States, residing at the city and county of Denver and State of Colorado, have invented certain new and useful Improvements in Brakes for Trucks; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in brakes for baggage trucks used at railway stations, my object being to provide a construction of the class in which the brake shall be automatically and normally applied to the front wheels of the truck to prevent the latter from moving from the position in which it is placed. Many accidents have occurred due to the movement of trucks of this character down inclines, the trucks running upon the track and being struck by trains. My improvement is designed to overcome this difficulty. Furthermore, the improvement includes a device adapted to prevent the tendency of the truck to tip over when the front wheels are turned at right angles to the body of the truck.

The specific construction illustrated in the drawing consists of a sort of caster wheel journalled in a stationary support and movable with the axle as the latter swings on the central or fifth-wheel axis of the vehicle.

Having briefly outlined my improvement, I will proceed to describe the same in detail, reference being made to the accompanying drawing in which is illustrated an embodiment thereof.

In this drawing:

Fig. 1 is a side elevation of a truck equipped with my improvement, the spokes of one of the front wheels being partly broken away to facilitate clearness of the illustration.

Fig. 2 is a fragmentary view of the truck partly in central vertical section.

Fig. 3 is a top plan view of the same.

Fig. 4 is a fragmentary side elevation, showing the truck tongue partly lowered and the brake shoes detached from the wheels.

The same reference characters indicate the same parts in all the views. Let the numeral 5 designate a truck provided with the regular fifth-wheel structure 6, whose upper portion 7 is stationary with the platform 8 by virtue of the connections 9, and whose lower portion 10 is connected to rotate on an axis passing through the transverse center of the axle and perpendicular to the axis of the wheels in the usual manner.

A brake beam 12 is mounted in guides 13, arranged near its opposite ends, which are equipped with brake shoes 14, adapted to engage the front wheels in the rear for braking purposes. This brake beam is further engaged by angle extremities 15, of arms 16, constituting a bifurcation of a bar 16, whose forward extremity is also bifurcated as shown at 17, to engage the lower extremity 18 of a tongue 19, the parts of the bifurcation engaging the tongue on opposite sides and being pivotally connected therewith as shown at 20. The angle extremities 15 of the bar 16 engage the brake beam in such a manner as to force the beam rearwardly when the tongue is moved to the lowered position, as indicated in Fig. 4, the tongue being fulcrumed as shown at 21 on the forward extremities 22 of two frame bars 23 which are connected, as shown at 25, with the axle 24 near its opposite extremities. The frame bars 23 approach each other as they extend forwardly from the axle and are provided with parallel rearward extensions 26 which merge into the guide members 13, which are closed at the rear, as shown at 27.

A spiral spring 28 has one extremity connected with the central part of the axle by means of an eye bolt 29, while its opposite extremity is connected with the brake beam by a similar eye bolt 30. This spring is under tension to normally maintain the brake beam in position to cause the brake shoes to engage the front wheels 31 of the truck and maintain the tongue 19 in the raised or upright position through the medium of the bar 16. When, however, the tongue is moved from the raised or upright position toward the ground or surface upon which the truck is standing, the brake beam is moved rearwardly and the brake shoes disengaged from the wheels 31, as will be readily understood.

Now, assuming that the front wheels of the truck are turned so that the axle occupies a position at right angles to the rear axle 32, there is a tendency for the truck to tip sidewise when the brakes are applied, since the brake shoes tightly engage the wheels 31, assuming that the wheels are in such a position that there is a tendency for them to move in the direction of the location of the shoes. In order to overcome this tendency, I provide a caster wheel 33, which is journalled as shown at 34, in a frame 35, composed of two members 36, which are respectively connected with and supported by the parallel frame parts 26.

From the foregoing description, the use and operation of my improvement will be readily understood. Normally, or when the truck is at rest, the brakes will be applied and the tongue will be in the upright position, or that shown in Figs. 1, 2 and 3. When it is desired to move the truck, the tongue will be moved downwardly to a proper position for pulling the truck, in which event the brakes will be detached from the wheels. As the front wheels are turned to throw the front axle out of parallelism with the rear axle, the caster wheel will readily move to a corresponding position, turning on its own axis to facilitate and aid in such movement, and will prevent any tendency of the truck to tip when the front axle is in position at right angles to that of the rear axle.

Attention is called to the fact that the frame 35 which supports the caster wheel 33, extends beyond the wheels of the vehicle on the side where the brakes are applied, so that the caster wheel will project sufficiently beyond the wheels to give a lateral support to the vehicle in order to overcome any tendency to tip over when the front axle is thrown out of parallelism with the rear axle, or in a position at right angles thereto, as heretofore explained. This will be readily understood from an inspection of the drawing.

I claim:

In combination with the front wheels and axle of a vehicle having the usual fifth wheel structure, a frame secured to said axle, said frame comprising two bars having portions extending to the front of said axle and portions extending to the rear thereof, the portions extending to the front of the axle converging, a tongue pivotally mounted between said converging portions, the portion extending to the rear of the axle being parallel and extending rearwardly beyond the rim of the wheels, the rearward end of said parallel portions being reversely bent, whereby they are adapted to form a brake beam guide, a brake beam slidably mounted in said guides, a spring joining said brake beam to said axle, said tongue having its end extending below the said pivot, and a bar pivotally connected to the end of the tongue and to said brake whereby movement of said tongue will be transmitted to said brake.

In testimony whereof I affix my signature.

AXEL G. STEPHENSON.